United States Patent
Marti et al.

(10) Patent No.: US 8,194,943 B2
(45) Date of Patent: Jun. 5, 2012

(54) METHOD FOR AUTOMATICALLY RECOGNIZING FINGERPRINTS

(75) Inventors: Sandra Marti, Nanterre (FR); Cyril Allouche, Saint-Arnoult-en-Yvelines (FR)

(73) Assignee: Thales (FR)

( * ) Notice: Subject to any disclaimer, the term of this patent is extended or adjusted under 35 U.S.C. 154(b) by 792 days.

(21) Appl. No.: 12/092,723

(22) PCT Filed: Oct. 31, 2006

(86) PCT No.: PCT/EP2006/067975
§ 371 (c)(1),
(2), (4) Date: Feb. 5, 2009

(87) PCT Pub. No.: WO2007/054450
PCT Pub. Date: May 18, 2007

(65) Prior Publication Data
US 2009/0185724 A1    Jul. 23, 2009

(30) Foreign Application Priority Data
Nov. 8, 2005 (FR) .................................. 05 11355

(51) Int. Cl.
*G06K 9/00* (2006.01)

(52) U.S. Cl. ...................................... 382/125

(58) Field of Classification Search .......... 382/115, 382/124, 125, 209, 218; 283/68; 340/5.83; 713/186; 902/3
See application file for complete search history.

(56) References Cited

U.S. PATENT DOCUMENTS

| | | | |
|---|---|---|---|
| 4,896,363 A * | 1/1990 | Taylor et al. | 382/125 |
| 6,049,621 A * | 4/2000 | Jain et al. | 382/125 |
| 6,487,306 B1 * | 11/2002 | Jain et al. | 382/125 |
| 2008/0298646 A1 * | 12/2008 | Wennergren | 382/124 |

FOREIGN PATENT DOCUMENTS

| | | |
|---|---|---|
| EP | 0 791 891 | 8/1997 |
| EP | 1 403 810 | 3/2004 |

OTHER PUBLICATIONS

Ross, A. et al. "A Hybrid Fingerprint Matcher." Pattern Recognition, Elsevier, Kidlington, GB, vol. 36, No. 7, Jul. 2003, pp. 1661-1673, XP004417159, ISSN: 0031-3203.

* cited by examiner

*Primary Examiner* — Daniel Mariam
(74) *Attorney, Agent, or Firm* — Lowe Hauptman Ham & Berner, LLP

(57) ABSTRACT

The present invention relates to a method of automatically recognizing fingerprints, consisting in establishing a database by digitizing images of fingerprints of individuals, by detecting the corresponding minutiae, by selecting the most discriminating minutiae, by storing the characteristic parameters of these minutiae, then, in the step for recognizing prints of a given individual, in digitizing the fingerprints of this individual, in detecting the minutiae of these fingerprints, in storing their characteristic parameters, in comparing these parameters with those stored in the database, and it is characterized in that, on establishing the database and on taking prints of said given individual, for each print in the database and of the individual concerned, at least the spectra of the selected minutiae are stored as characteristic parameters of the minutiae, and in that, after comparison of the characteristic parameters of the prints of the individual with the corresponding parameters of the prints in the database, a score is deduced for each of the duly performed comparisons, and the decision is made.

11 Claims, 1 Drawing Sheet

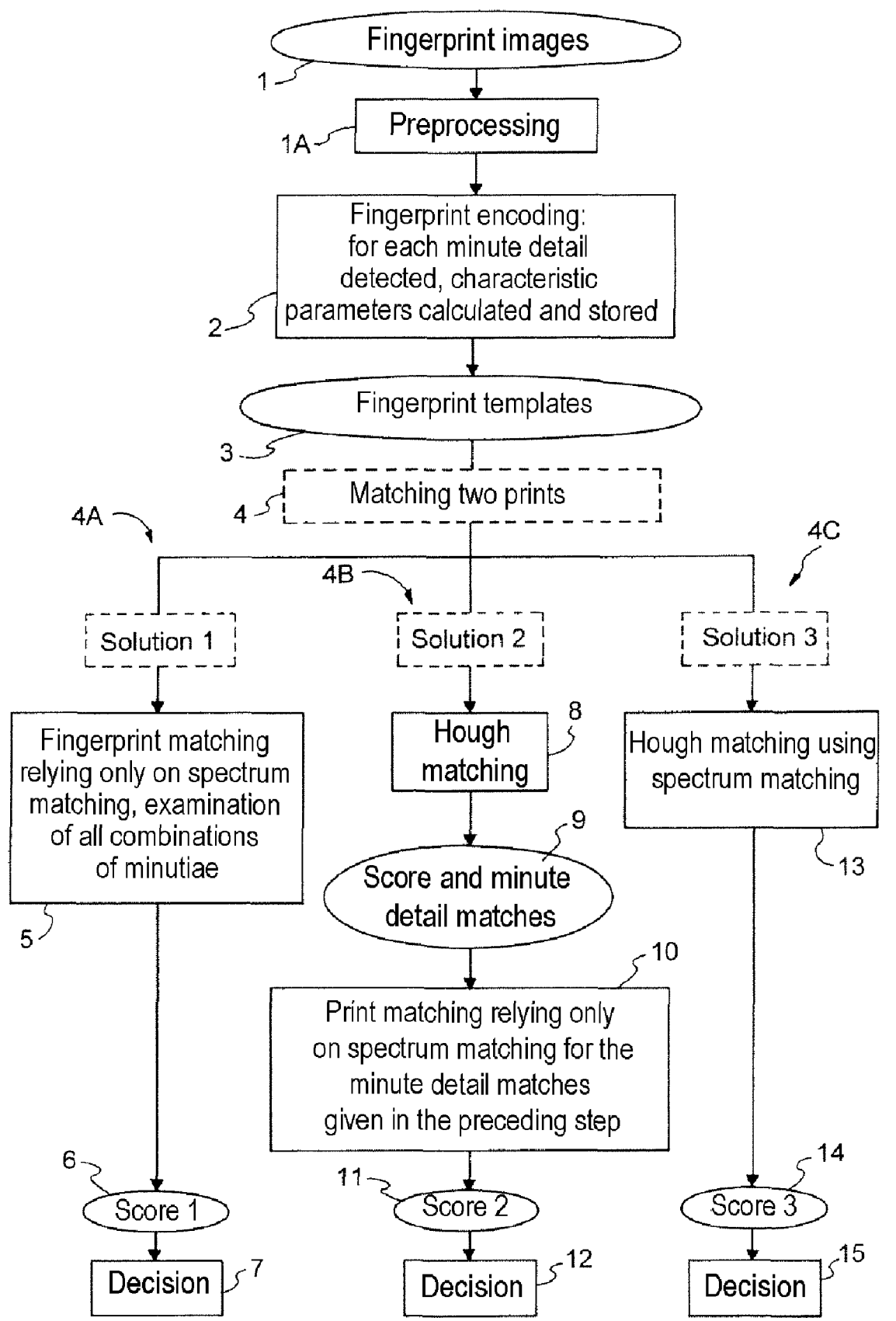

US 8,194,943 B2

METHOD FOR AUTOMATICALLY RECOGNIZING FINGERPRINTS

CROSS-REFERENCE TO RELATED APPLICATIONS

The present Application is based on International Application No. PCT/EP2006/067975, filed on Oct. 31, 2006, which in turn corresponds to French Application No. 05 11355, filed on Nov. 8, 2005, and priority is hereby claimed under 35 USC §119 based on these applications. Each of these applications are hereby incorporated by reference in their entirety into the present application.

FIELD OF THE INVENTION

The present invention relates to a method of automatically recognizing fingerprints.

BACKGROUND OF THE INVENTION

The current fingerprint recognition methods, when used in particular to identify individuals in order to allow, for example, access to protected premises, the use of certain appliances or the checking of identities, are often based on the "minutiae" of these fingerprints, that is, particular areas or points of the prints that enable them to be discriminated from each other. The parameters of these minutiae are normally their coordinates, their orientation and their valency (that is, the type of the minute detail, which can be a bifurcation or a line end). Furthermore, to refine the discrimination, other complementary parameters are used, which are, for example, local statistical information or "ridge-counts". Taking account of all of these parameters means constructing an extremely voluminous database when it contains the fingerprints of a large number of individuals, and the operation for comparing fingerprints of an individual with those from such a database containing the prints of a large number of individuals requires a lengthy computation time.

SUMMARY OF THE INVENTION

One object of the present invention is a method of automatically recognizing fingerprints, the implementation of which requires the minimum possible amount of data to be stored on a database and the minimum computation time for the comparison of prints with those stored for a certain number of individuals, and yet which gives an optimum result.

The inventive method is a method of automatically recognizing fingerprints, consisting in establishing a database by digitizing images of fingerprints of individuals, by detecting the corresponding minutiae, by selecting the most discriminating minutiae, by storing the characteristic parameters of these minutiae, then, in a step for recognizing prints of a given individual, in digitizing the fingerprints of this individual, in detecting the minutiae of these fingerprints, in storing their characteristic parameters, in comparing these parameters with those stored in the database, and characterized in that, on establishing the database and on taking prints of said given individual, for each print in the database and of the individual concerned, at least the spectra of the selected minutiae are stored as characteristic parameters of the minutiae, and in that, after comparison of the characteristic parameters of the prints of the individual with the corresponding parameters of the prints in the database, a score is deduced for each of the duly performed comparisons, and a decision is made.

According to another characteristic of the invention, a decision is made by comparing the final score, obtained from all the comparison results, with a threshold determined by learning.

According to another characteristic of the invention, the calculation of the spectrum of each minute detail is optimized by extracting a box encompassing this minute detail to obtain a thumbnail image of the content of this box, by calculating the spectrum of this thumbnail image, by realigning the spectrum by rotation according to the orientation of the minute detail, by reducing the dimension of this spectrum after rotation and by storing this reduced spectrum.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention will be better understood from reading the detailed description of an embodiment, taken by way of nonlimiting example and illustrated by the appended drawing, in which:

the single FIGURE is a simplified timing diagram of an exemplary implementation of the inventive method.

DETAILED DESCRIPTION OF THE DRAWINGS

The single FIGURE represents the drawing of the main steps in implementing the inventive method. For the steps preceding those relating to the comparison, the drawing does not show the difference between, on the one hand, the taking of fingerprints and their processing for an entire population of individuals, in order to construct a database, and, on the other hand, the same operations performed later for a given individual for whom an identity is sought by comparing the characteristics of his fingerprints with those of the prints stored in this database, because all these operations are performed in the same way.

Firstly, all the fingerprints are stored (1) and digitized, then this digitized information is encoded (2). Optionally, a preprocessing (1A) can be performed between the steps 1 and 2. This preprocessing mainly consists in checking the quality of the images obtained after the step 1, with a view to rejecting the images that cannot be used because of excessively poor quality. This encoding (2) mainly consists, for each minute detail detected, in calculating and storing its coordinates, orientation, valency and spectrum. The "template" (set of data that characterizes a print, namely its minutiae, general information on its image, its centers, and so on) is then established (3). Then, the characteristics of a given print are compared (4), two by two, with all those of the prints in the database. This type of comparison is also well known by the name "matching", and will simply be called comparison throughout the text. According to the invention, this comparison can be done in three different main ways, denoted 4A to 4C.

To calculate a fingerprint comparison score, the probability of matching each pair of minutiae examined (a minute detail of a print from the database and a corresponding minute detail from the print of the individual to be identified) is for example calculated. To this end, the correlation C of these two spectra, and then the probability P of matching this pair, are calculated. This probability depends on the correlation C and the valencies of the two minutiae, which represents three input parameters for this function.

According to the solution 4A, the comparison (5) is performed only by comparing the spectra of the minutiae and examining all the possible combinations of minutiae. To perform this comparison, each time, a pair of minutiae is examined, one belonging to a fingerprint from the database and the other to the print of the individual to be identified. Then, the final score (6) is calculated by using all the comparison results. A score is calculated by summing the various values P weighted by a determined coefficient, and a decision is made (7) (identification or not of the individual whose prints have just been compared with those from the database). This decision is made by comparing the final score with a threshold. The threshold is found by learning, by carrying out tests on an image base representative of the population for which the print recognition system is intended. This threshold is set on delivery of the system, and there is no automatic adaptation of the threshold according to the quality of the prints. It is the fastest of the three methods 4A to 4C. It will be noted that, when implementing the methods 4B and 4C, described below, a decision is also made by comparing the final score with a threshold.

According to the solution 4B, a conventional comparison (8) is performed beforehand, taking into account only the coordinates, valency and orientation of the minutiae. This comparison is, for example, of the so-called "Hough matching" type and is performed each time on a pair of minutiae (one minute detail of a print from the database and one minute detail from the print of the individual to be identified). The comparison of the Hough matching type is performed on all the possible combinations, according to a certain tolerance, that is, the difference of orientation between two minutiae must not exceed a certain maximum value, and the same applies for the differences between coordinates. This is a way of limiting the number of comparisons to be performed and so saving computation time. At the output of the Hough comparison, a first print comparison score is obtained (9) as is a list of the best minute detail matches. These best pairs of minutiae then undergo a second comparison in order to consolidate the first result. This second comparison (10) is performed only on the spectra of the minutiae retained in the step (9). The final score is calculated (11) from the different results of these spectrum comparisons, and a decision is made (12) based on the final score.

According to the solution 4C, a comparison is directly performed (13) of the "Hough matching" type, this comparison relating to the following four characteristic parameters of the minutiae: coordinates, orientation, valency and spectrum. The comparison score of two prints is then calculated by using the results of these minute detail comparisons (14) and a decision is made (15). This solution is the most efficient of the three in terms of identification reliability.

The calculation of each of the spectra of the minutiae is performed as follows. From the images obtained in the step 1 (or 1A), an "encompassing box" around each selected minute detail is extracted, this box retaining only the relevant part of the minute detail, that is, the only one necessary for the subsequent comparison. Then, the spectrum of this thumbnail image is calculated using a Fourier transform (for example an FFT). Then, the spectrum is realigned by rotation, this rotation being dependent on the orientation associated with the corresponding minute detail, then the dimension of the spectrum is reduced, for example by selecting a useful spectral band, or even by a main component analysis or an undersampling. Finally, the duly processed spectrum is stored in the "template" associated with the print being examined.

In conclusion, the inventive method makes it possible to perform an optimal fingerprint recognition because the spectral domain information is less sensitive than the gray level information to the print acquisition conditions (under-inking, over-inking, etc.), and this information does not occupy too great a volume (thanks to the possibility of reducing the dimensions of the spectrum).

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

The invention claimed is:

1. A method of automatically recognizing fingerprints, the method comprising:
  establishing a database, wherein establishing the database includes digitizing images of fingerprints of individuals, detecting corresponding minutiae, selecting discriminating minutiae, and storing characteristic parameters of the selected minutiae;
  digitizing fingerprints of an individual for comparison;
  detecting minutiae of the fingerprints of an individual for comparison;
  storing characteristic parameters of the fingerprints of an individual for comparison, wherein characteristic parameters include at least the spectra of the selected discriminating minutiae;
  comparing characteristic parameters of the fingerprints of an individual for comparison with those stored in the database;
  deducing a score based on the comparison of the parameters characteristic of the prints of the individual with the corresponding parameters of the prints in the database; and
  determining whether a match has been made based on the score.

2. The method as claimed in claim 1, wherein the determination is made by comparing the final score, obtained from all the comparison results, with a threshold determined by learning.

3. The method as claimed in claim 1, wherein the storing of the spectrum of the selected discriminating minutiae is optimized by extracting a box encompassing the selected discriminating minutiae to obtain a thumbnail image of content of the box, by calculating a spectrum of the thumbnail image, by realigning the spectrum by rotation according to an orientation of the selected discriminating minutiae, by reducing a dimension of the spectrum after rotation and by storing the reduced spectrum.

4. The method as claimed in claim 3, wherein the reduction of the dimension of the spectrum is done by selecting a useful spectral band.

5. The method as claimed in claim 3, wherein the reduction of the dimension of the spectrum is done by main component analysis.

6. The method as claimed in claim 3, wherein the reduction of the dimension of the spectrum is done by undersampling.

7. The method as claimed in claim 1, wherein the spectra of the minutiae are obtained by Fourier transform.

8. The method as claimed in claim 1, wherein deducing a score comprises:
   calculating a correlation C of a probability of matching each pair of minutiae; and
   calculating a probability P of matching the pair, which depends on the correlation C and valencies of the minutiae of the matching pair.

9. The method as claimed in claim 1, wherein the comparison is done only using the spectra of the selected discriminating minutiae.

10. The method as claimed in claim 1, wherein the comparison is performed utilizing "Hough matching" and utilizes the spectra of the selected discriminating minutiae, and the coordinates, orientation and valency of the selected discriminating minutiae.

11. The method as claimed in claim 1, wherein the comparison comprises:
   performing "Hough matching" utilizing the coordinates, orientation and valency of the selected discriminating minutiae, including a calculation of minute detail comparison and matching scores, and
   comparing spectra of the minute detail matches obtained in the Hough matching step.

* * * * *